B. GUERRERO, J. R. VIOSCA & A. R. GAXIOLA.
CLIPPER.
APPLICATION FILED OCT. 23, 1916.
1,232,291. Patented July 3, 1917.
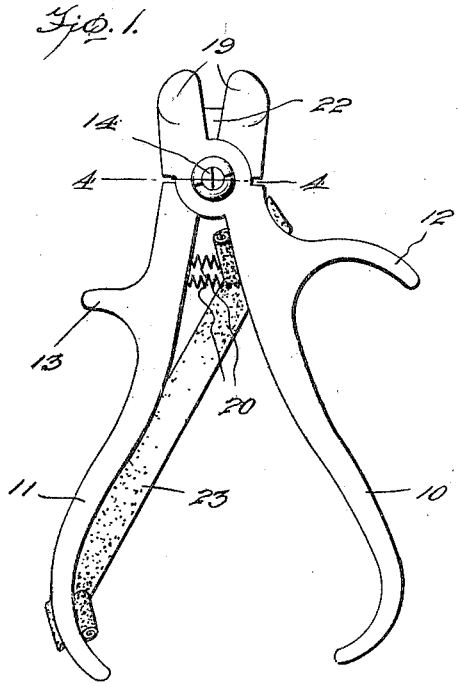
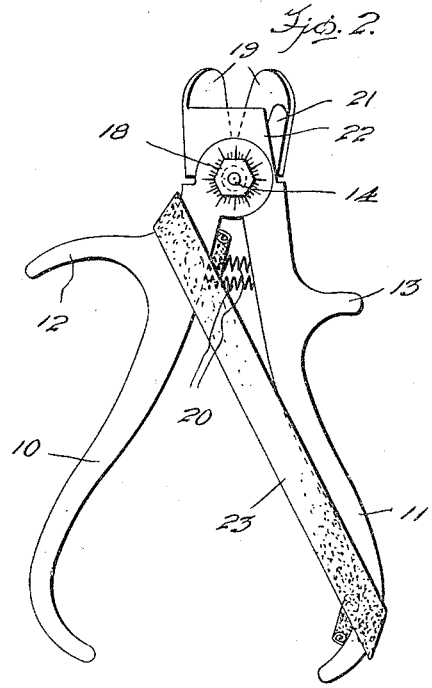
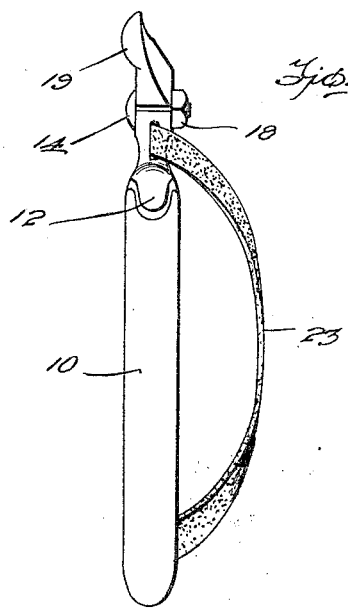
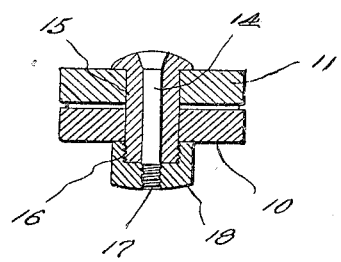
B. Guerrero, Inventors
J. R. Viosca.
A. R. Gaxiola.
By John Louis Walter
Attorney

UNITED STATES PATENT OFFICE.

BENIGNO GUERRERO, JOSÉ R. VIOSCA, AND AURELIO R. GAXIOLA, OF ANAHEIM, CALIFORNIA, ASSIGNORS OF ONE-FOURTH TO G. W. SANDILANDS, OF ANAHEIM, CALIFORNIA.

CLIPPER.

1,232,291.   Specification of Letters Patent.   Patented July 3, 1917.

Application filed October 23, 1916. Serial No. 127,264.

*To all whom it may concern:*

Be it known that we, BENIGNO GUERRERO and JOSÉ R. VIOSCA, citizens of the Reublic of Mexico, and AURELIO R. GAXIOLA, a citizen of the United States, residing at Anaheim, in the county of Orange and State of California, have invented certain useful Improvements in Clippers, of which the following is a specification, reference being had therein to the accompanying drawings.

The invention relates to clippers, and more particularly to the class of fruit clippers.

The primary object of the invention is the provision of a clipper of this character by means of which oranges, lemons, grape fruit and other fruit or the like can be conveniently separated from their stems and also leaves removed without reversing the tool when in use.

Another object of the invention is the provision of a clipper of this character wherein the construction thereof is novel in form so that the stem can be cut close to the fruit and the leaves removed that grow about the same.

The nature and advantages of the invention will be better understood from the following description when read in connection with the accompanying drawing, the invention residing in the construction, combination and arrangement of parts as claimed.

In the drawings forming part of this specification, wherein like numerals of reference indicate similar parts—

Figure 1 is an elevation of a clipper constructed in accordance with the invention;

Fig. 2 is an elevation looking toward the opposite side;

Fig. 3 is an edge view;

Fig. 4 is an enlarged sectional view taken on the line 4—4 of Fig. 1.

Referring more particularly to the drawing in detail, a pair of crossed pivoted handles is indicated at 10 and 11 respectively, each of which is peculiarly shaped to adapt itself to the hand of the user, while projecting from the handle 10 is an extension 12 curved to fit between the thumb and the index finger, while projecting from the handle 11 is a relatively short extension 13 upon which the index finger is adapted to rest.

The handles are pivoted together by means of a headed screw 14, upon which is fitted a sleeve 15 having one extremity externally threaded, as at 16, and this sleeve terminates short of the threaded end 17 of the screw 14 which, together with the said sleeve, in reality constitutes a double screw, the sleeve being designed to form the pivot for the handles 10 and 11 and is passed through suitable apertures in the overlapped portions of the respective handles, and held associated therewith through the medium of a nut 18 designed to engage the threaded extremities of the bolt 14 and the sleeve 15. The sleeve, by reason of the threads thereon, is adapted to turn in one direction while the nut 18 is designed to turn in the opposite direction when engaging the bolt 14 to fasten the latter for holding the handles tightly together.

The end of each handle adjacent the pivot is provided with a blade 19 and each of said blades is preferably concavo-convexed, with their edges adjacent each other sharpened. The particular formation of these blades permits the same to cut the stem close to the fruit without in any way injuring the latter. The blades are normally held separated, with their cutting edges adjacent one another and disposed in convergent relation, the springs 20 being designed to normally separate the blades and are disposed between the handles and connected thereto in any suitable manner. The blade on the handle 10 has the outer edge thickened and dished on its inner surface to provide a sharpened edge 21, while projecting at an angle from the outer edge of the blade on the handle 11 in the direction of the said sharpened edge is an extension 22 which also is formed with a sharpened edge and coöperates with the edge 21 for the purpose of removing leaves and the like that grow about the fruit when the clipper is operated so that the stem and the leaves will be severed or cut from the fruit in a single operation. It will be noted that the cutting edge 21 and extensions 22 are on the rear of the blades and they cut the leaves at the same time that the blades cut the stem from the fruit and thereby eliminate the reversing of the tool and at the same time effect the cutting of the stem and the removal of the leaves in a single operation.

The double pivot means or screw can be easily taken out or removed from the handle of the tool to permit the oiling and cleaning of the blades of the tool and also the pivot therefor. There is no possibility of the nut working off of the bolt 14 or the sleeve 15, thereby eliminating the possibility of the separation of the handles when the tool is subjected to constant and excessive use.

A leather strap or the like, indicated at 23, extends diagonally across the handles 10 and 11 and has its opposite terminals secured thereto in any suitable manner, the strap being provided to extend across the hand of the user to prevent the tool from being inadvertently dropped and also permits the tool to be carried upon the hand in a convenient manner.

While it is believed that from the foregoing description the nature and advantages of the invention will be readily apparent, we desire it to be understood that changes may be resorted to when desired as fall within the scope of the appended claim. The clipper possesses simplicity of construction, durability and efficiency in operation. It is to be understood that changes, variations and modifications may be made as come properly within the scope of the claim appended hereunto.

Having thus described our invention, we claim:

A clipper of the character described including a pair of cross pivoted handles, a concavo-convex blade formed on the outer end of each handle, the adjacent edges of the blades being sharpened, the outer edge of one blade being thickened and dished on its rear surface to provide a cutting edge, an angularly projecting extension formed on the outer edge of the opposite blade having a sharpened edge for coöperating with the sharpened outer edge of the other blade at the same time the sharpened adjacent edges of the blade coöperate with each other when the handles are moved toward each other.

In testimony whereof we affix our signatures.

BENIGNO GUERRERO.
JOSÉ R. VIOSCA.
AURELIO R. GAXIOLA.

Copies of this patent may be obtained for five cents each, by addressing the "Commissioner of Patents. Washington, D. C."